United States Patent
Nemedi

(10) Patent No.: US 12,111,663 B2
(45) Date of Patent: Oct. 8, 2024

(54) SYSTEM AND METHOD OF ORGANIZING AND CONTROLLING AUTONOMOUS VEHICLES

(71) Applicant: William D. Nemedi, Paw Paw, MI (US)

(72) Inventor: William D. Nemedi, Paw Paw, MI (US)

( * ) Notice: Subject to any disclaimer, the term of this patent is extended or adjusted under 35 U.S.C. 154(b) by 722 days.

(21) Appl. No.: 16/923,537

(22) Filed: Jul. 8, 2020

(65) Prior Publication Data

US 2021/0103288 A1    Apr. 8, 2021

Related U.S. Application Data

(60) Provisional application No. 62/909,334, filed on Oct. 2, 2019.

(51) Int. Cl.
| | | |
|---|---|---|
| *G05D 1/00* | (2024.01) | |
| *G06Q 10/20* | (2023.01) | |
| *G06Q 20/14* | (2012.01) | |
| *G07C 5/00* | (2006.01) | |

(52) U.S. Cl.
CPC .......... *G05D 1/0225* (2013.01); *G06Q 10/20* (2013.01); *G06Q 20/145* (2013.01); *G07C 5/008* (2013.01)

(58) Field of Classification Search
CPC .... G05D 1/0225; G06Q 10/20; G06Q 20/145; G07C 5/008
USPC ............................................................ 701/27
See application file for complete search history.

(56) References Cited

U.S. PATENT DOCUMENTS

| | | |
|---|---|---|
| 9,267,306 B2 | 2/2016 | Suhami |
| 9,508,260 B2 | 11/2016 | Shaik |
| 9,567,007 B2 | 2/2017 | Cudak et al. |
| 9,805,519 B2 | 10/2017 | Ramanujam |
| 9,944,282 B1 | 4/2018 | Fields et al. |
| 9,984,572 B1 | 5/2018 | Newman |
| 10,023,231 B2 | 7/2018 | Ramanujam |

(Continued)

FOREIGN PATENT DOCUMENTS

| | | | |
|---|---|---|---|
| JP | 2004005133 A | * | 1/2004 |
| JP | 2005085118 A | * | 3/2005 |

(Continued)

OTHER PUBLICATIONS

International Application No. PCT/US2020/041167, International Search Report and Written Opinion, mailed Oct. 7, 2020.

*Primary Examiner* — Isaac G Smith
(74) *Attorney, Agent, or Firm* — MARSHALL, GERSTEIN & BORUN LLP

(57) ABSTRACT

Systems and methods for facilitating storage of an autonomous vehicle ("AV") in a storage facility are disclosed. A server receives a storage request from an electronic device and retrieves a set of available storage facilities stored in a storage facilities database. The server obtains a current location of the AV and determines a preferred storage facility of the set of available storage facilities based in part on the current location of the AV and a set of storage preferences stored in a storage preference database. The server generates a set of vehicle control instructions based on a location of the preferred storage facility and the location of the AV, and transmits the set of vehicle control instructions to the AV causing the AV to navigate to the preferred storage facility from the current location of the AV.

21 Claims, 5 Drawing Sheets

(56) References Cited

U.S. PATENT DOCUMENTS

| | | | |
|---|---|---|---|
| 2003/0112154 A1* | 6/2003 | Yoakum | G08G 1/14 |
| | | | 340/932.2 |
| 2011/0302092 A1* | 12/2011 | Basir | G06Q 10/20 |
| | | | 705/305 |
| 2015/0094903 A1* | 4/2015 | Bell | G07C 5/0808 |
| | | | 701/1 |
| 2016/0039291 A1* | 2/2016 | Reese | G07C 5/0841 |
| | | | 701/29.3 |
| 2017/0032584 A1 | 2/2017 | Moran et al. | |
| 2017/0109942 A1* | 4/2017 | Zivkovic | G07B 15/04 |
| 2017/0255881 A1* | 9/2017 | Ritch | G08G 1/096822 |
| 2017/0329346 A1 | 11/2017 | Latotzki | |
| 2018/0001930 A1* | 1/2018 | Sham | G01S 15/86 |
| 2018/0018870 A1 | 1/2018 | Sehra et al. | |
| 2018/0194344 A1 | 7/2018 | Wang et al. | |
| 2018/0196429 A1 | 7/2018 | Goldberg et al. | |
| 2018/0261017 A1 | 9/2018 | Kim | |
| 2019/0012625 A1* | 1/2019 | Lawrenson | G07C 5/008 |
| 2019/0057376 A1* | 2/2019 | Perez-Tamayo | G06Q 20/127 |
| 2019/0079519 A1* | 3/2019 | Hwang | G06Q 10/04 |
| 2019/0204097 A1* | 7/2019 | Starns | G07C 5/008 |
| 2019/0236951 A1* | 8/2019 | Mason | G08G 1/146 |
| 2020/0160710 A1 | 5/2020 | Obayashi et al. | |
| 2020/0279490 A1* | 9/2020 | Price | H04W 4/44 |
| 2021/0081907 A1* | 3/2021 | Solomon | G06Q 30/018 |

FOREIGN PATENT DOCUMENTS

| | | | | |
|---|---|---|---|---|
| JP | 2012003474 A | * | 1/2012 | |
| WO | WO-2004042673 A2 | * | 5/2004 | G06K 9/00785 |
| WO | WO-2019/022056 A1 | | 1/2019 | |

* cited by examiner

SYSTEM AND METHOD OF ORGANIZING AND CONTROLLING AUTONOMOUS VEHICLES

CROSS-REFERENCE TO RELATED APPLICATION

The present application claims priority to U.S. Application No. 62/909,334, filed Oct. 2, 2019. The priority application is hereby incorporated by reference.

FIELD OF THE DISCLOSURE

The present disclosure generally relates to autonomous vehicles and, in particular, to an application directed to the organization and control of individual, or fleets of, autonomous vehicles.

BACKGROUND

Advancements in the operation of vehicles are slowly paving the way for a future with less time spent actually operating a vehicle as individuals travel from point A to point B. In particular, some semi-autonomous features, such as, for example, assisted parking, self-braking systems, and adaptive cruise control, give society a glimpse of the bright future that lies ahead. Moreover, interactions between autonomous vehicles and infrastructure, autonomous vehicles and other vehicles, and autonomous vehicles and people that were not possible before are becoming a reality as society moves away from non-autonomous vehicles and toward semi- and fully-autonomous vehicles. Such interaction is possible, in part, due to the connected nature of semi- and fully-autonomous vehicles. For example, many semi- or fully-autonomous vehicles are connected to the internet or have the capability to connect to the internet, which was not previously possible with non-autonomous vehicles. Such connectivity allows for a level of control and interaction between infrastructure, other vehicles, and people that was not previously possible.

SUMMARY

In accordance with a first exemplary aspect of the present disclosure, a computer implemented method for facilitating storage of an autonomous vehicle in a storage facility is provided. The method includes receiving, at a server, a storage request from an electronic device. The server includes a storage facilities database and a storage preference database stored on a memory of the server. Retrieving, in response to the storage request, a set of available storage facilities stored in the storage facilities database. The method also includes obtaining a current location of the autonomous vehicle and determining, by a computer processor of the server, a preferred storage facility of the set of available storage facilities based in part on the current location of the autonomous vehicle and a set of storage preferences stored in the storage preference database. The method further includes generating, by the computer processor based on a location of the preferred storage facility, a set of vehicle control instructions. The method then includes transmitting the set of vehicle control instructions to the autonomous vehicle, wherein the autonomous vehicle executes the set of vehicle control instructions to cause the autonomous vehicle to navigate from the current location of the autonomous vehicle to the location of the storage facility. Finally, the method includes receiving, at the server, an arrival signal when the autonomous vehicle arrives at the preferred storage facility.

In accordance with a second exemplary aspect of the present disclosure, a computer implemented method for facilitating storage of an autonomous vehicle in a storage facility is provided. The method includes receiving, at a server, a storage request from an electronic device. The server includes a storage facilities database and a storage preference database stored on a memory of the server. Retrieving, in response to the storage request, a set of available storage facilities stored in the storage facilities database. Transmitting, to the electronic device, the set of available storage facilities; selecting, via a user interface of the electronic device, a preferred storage facility of the set of available storage facilities. The method includes generating, by a computer processor of the server based on a location of the preferred storage facility, a set of vehicle control instructions. Transmitting the set of vehicle control instructions to the autonomous vehicle, wherein the autonomous vehicle executes the set of vehicle control instructions to cause the autonomous vehicle to navigate from the current location of the autonomous vehicle to the location of the preferred storage facility. The method also includes receiving, at the server, an arrival signal when the autonomous vehicle arrives at the preferred storage facility.

In accordance with a third exemplary aspect of the present disclosure, a system for facilitating storage of an autonomous vehicle in a storage facility where the autonomous vehicle is communicatively coupled to an electronic device is provided. The system includes a server having a storage facilities database and a storage preference database stored on a memory of the server, a communication module configured to communicatively couple the server, the autonomous vehicle, and the electronic device via at least one network connection, a set of computer-executable instructions stored on the memory, and a processor of the server interfacing with the communication module. The processor is configured to execute the set of computer-executable instructions to cause the processor to receive a storage request from the electronic device and, in response to receiving the storage request from the electronic device: retrieve a set of available storage facilities from the storage facilities database; obtain a location of the autonomous vehicle; determine a preferred storage facility based in part on the location of the autonomous vehicle and a set of storage preferences stored in the storage preference database; generate, based on the location of the autonomous vehicle and a location of the preferred storage facility, a set of vehicle control instructions for the autonomous vehicle; and provide the set of vehicle control instructions to the autonomous vehicle via the communication module, wherein the autonomous vehicle executes the set of vehicle controls instructions to cause the autonomous vehicle to navigate from the location of the autonomous vehicle to the location of the preferred storage facility.

DETAILED DESCRIPTION

Self-driving automobiles, or autonomous vehicles, have advanced considerably in recent years because of the advancements made by major automotive manufacturers and software companies. As fully autonomous vehicles become more of a reality, new avenues of traffic control and traffic patterns may emerge as driving becomes more and more automated. While a fully autonomous future may seem scary to some, it also ushers in a new era of safety features and control capabilities that were not possible before. Such unexplored control capabilities allow for new ways of controlling traffic and potentially reducing congestion in crowded metropolitan areas by controlling and manipulating vehicles in ways that were not possible before.

The claimed systems and methods provide a solution for safe and convenient storage of autonomous vehicles during low usage hours and/or during recharging of the battery powered drive systems. In particular, the claimed systems and methods provide a software application, stored and run on a computer processor of a server that coordinates storage of individual, or fleets of, autonomous vehicles. The storage facilities where individual, or fleets of, autonomous vehicles are stored may be privately owned garages or larger privately-owned warehouses. The software application also runs on an electronic device (e.g., a smart phone) and allows individual users of the software application to list a storage facility (e.g., a garage) in which an autonomous vehicle can be stored or list autonomous vehicles (e.g., individual or fleets of autonomous vehicles) that can be stored in a storage facility.

The systems and methods therefore offer numerous benefits. In particular, the claimed systems and methods provide efficient traffic management which may reduce the number of vehicles on the road during traditionally busier hours in the day. With fewer vehicles on the road, more parking spaces will become available and travel times throughout metropolitan areas may be reduced. Additionally, safe and convenient repair and general maintenance of vehicles is made possible due to the interconnectivity of autonomous vehicles. For example, the systems and methods disclosed herein can interact with third-party service providers to schedule regular service and maintenance of the autonomous vehicles so that the autonomous vehicles are operational during peak hours and undergoing service and maintenance during off-peak hours. Moreover, the systems and methods provide a source of income for owners of storage facilities. For example, owners of storage facilities, or larger warehouses, can receive compensation (e.g., monetary, ride share credits, etc.) in exchange for storing autonomous vehicles. Additionally, the owners may be compensated for performing services (e.g., cleaning, charging, repairing, etc.) on the autonomous vehicle stored in the storage facility.

Figure 1:
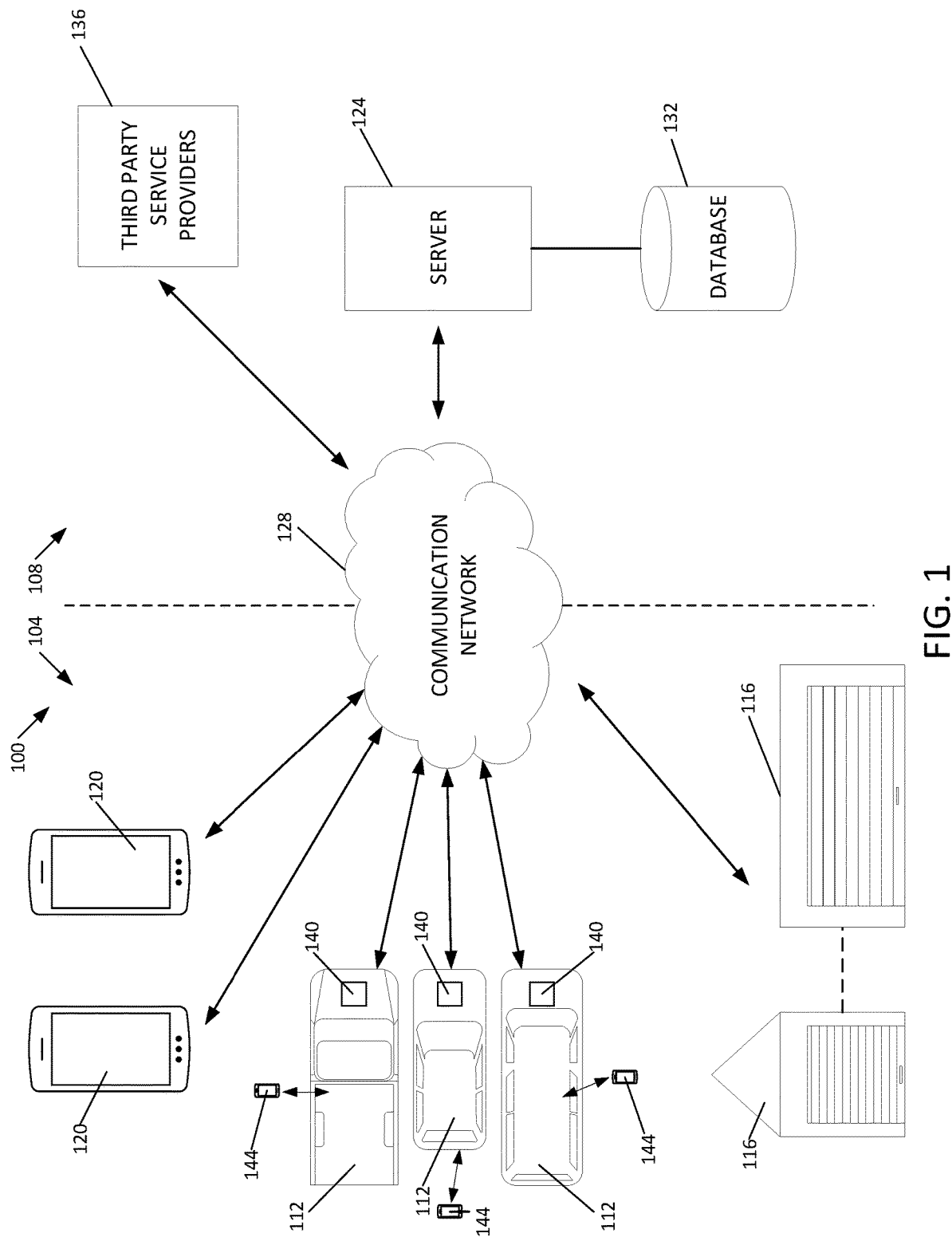
FIG. 1 depicts an overview of components and entities associated with the systems and methods, in accordance with the teachings of the present disclosure.

FIG. 1 illustrates an overview of a system 100 of components configured to facilitate the systems and methods disclosed herein. Generally, the system 100 includes both hardware components and software applications that may execute on the hardware components, as well as various other components. It should be appreciated that the system 100 is merely an example and that alternative or additional components are envisioned. As illustrated in FIG. 1, the system 100 may be divided into a set of front-end components 104 and a set of back-end components 108. The front-end components 104 include at least one autonomous vehicle 112, at least one storage facility 116, and an electronic device 120, and the back-end components 108 include a server 124 communicatively coupled to a communication network 128, a database 132 stored on a memory of the server 124, and third-party service providers 136. The electronic device 120 receives inputs from a user and is communicatively coupled to the other front-end components 104 (e.g., the autonomous vehicle 112, the at least one storage facility 116, etc.) via the communication network 128. Additionally, each of the front-end components 104 (e.g., the autonomous vehicle 112, the at least one storage facility 116, and the electronic device 120) are coupled to the server 124 via the communication network 128.

The autonomous vehicle 112 (hereinafter referred to as "the vehicle") can be, for example, an automobile, a car, a truck, a tow truck, a snowplow, a boat, a motorcycle, a motorbike, a scooter, a recreational vehicle, or any other type of vehicle capable of roadway or water travel. The vehicle 112 may be a vehicle capable of at least partial (or total) autonomous operation by a computer via the collection and analysis of various sensor data. Although FIG. 1 depicts three vehicles 112, it should be appreciated that additional vehicles 112 are envisioned.

A computer 140 may be permanently or removably installed in the vehicle 112, and may generally be an on-board computing device capable of performing various functions relating to automatic operation of the vehicle 112. Thus, the computer 140 may be configured with particular elements to thereby be able to perform functions relating to automatic operation of the vehicle. Further, the computer 140 may be installed by the manufacturer of the vehicle 112, or as an aftermarket modification or addition to the vehicle 112. Although only one computer 140 is discussed, it should be understood that in some embodiments, a plurality of computers 140 (which may be installed at one or more locations within the vehicle 112) can be used.

The system 100 further includes an electronic device 144 that may be associated with the vehicle 12, where the electronic device 144 may be any type of electronic device such as a mobile device (e.g., a smartphone), a notebook computer, a tablet, a phablet, a Global Positioning System ("GPS") or GPS-enabled device, a smart watch, smart glasses, a smart bracelet, a wearable electronic, a personal digital assistant ("PDA"), a pager, a computing device configured for wireless communication, and/or the like. The electronic device 144 may be equipped or configured with a set of sensors, such as a location module (e.g., a GPS chip), an image sensor, an accelerometer, a clock, a gyroscope, a compass, a yaw rate sensor, a tilt sensor, and/or other sensors.

The system 100 further includes the at least one storage facility 116 that stores at least one vehicle 112. The at least one storage facility 116 provides the owner(s) of the at least one vehicle 112 a safe and secure location for the vehicle 112 to be stored during off-peak hours, while the vehicle 112 has maintenance performed, or during charging of the vehicle 112. The at least one storage facility 116 may be any facility capable of securely and safely storing the vehicle 112 from, not only vandalism and theft, but also from the elements (e.g., rain, hail, snow, sleet, etc.). For example, the at least one storage facility 116 can be a privately owned single-car, two-car, three-car, . . . , $n^{th}$-car garage in a residential area. Example privately-owned garages can be disposed within a perimeter of a privately-owned property and can be disposed adjacent to or attached to a dwelling on the privately-owned property. In other embodiments, however, the at least one storage facility 116 can be a larger warehouse that safely and securely stores multiple vehicles 112. Example warehouses can be found in commercial areas due to the size of the structure and footprint necessary to build larger warehouses. However, larger warehouses may also be found in residential areas.

The at least one storage facility 116 may offer a number of amenities and services for the vehicle(s) 112 stored within the storage facility 116. For example, amenities and services for the vehicle(s) 112 can include a charging station for the vehicle 112, a cleaning service, and other general maintenance such as, for example, a twenty-nine-point inspection of the vehicle 112. A number of individuals can provide the amenities offered at the storage facility 116 and render the services offered at the storage facility 116. Examples of such individuals can include the owner or owners of the storage facility, employees of the storage facility, third party contractors, etc.

Additionally, while not illustrated, the at least one storage facility 116 may include sensors, audio and video surveillance, and internet-of-things ("IoT") devices. In particular, the at least one storage facility 116 may include sensors that monitor various parameters of the storage facility 116. For example, in one embodiment, a sensor disposed within the storage facility 116 can monitor how long the vehicle 112 has been stored within the storage facility 116. In such an embodiment, the sensor can record a first timestamp when the vehicle 112 enters the storage facility 116 and a second timestamp when the vehicle 112 leaves the storage facility 116. The server 124 may determine the elapsed time using the first and second timestamps and send the elapsed time (e.g., months, weeks, days, hours, seconds, etc.) spent by the vehicle 112 in the storage facility 116 to an electronic device in the possession of the owner of the vehicle 112, via the communication network 128. The server 124 may then automatically charge the owner of the vehicle 112 for the time spent in the storage facility 116 and tender a payment to the owner of the storage facility 116 in the amount paid by the owner of the vehicle 112. In another embodiment, the storage facility 116 includes audio and video surveillance to monitor the vehicle(s) 112 stored in the storage facility 116. For example, the storage facility 116 can include cameras and microphones connected to a closed-circuit TV ("CCTV") that is monitored by either the owner of the storage facility or a third-party contractor.

The communication network(s) 128 may include a proprietary network, a secure public internet, a virtual private network ("VPN"), and/or some other type of communication network, such as dedicated access lines, plain ordinary telephone lines, satellite links, cellular data networks, combinations of these and/or other types of networks. The communication network 128, or communication networks, may utilize one or more radio frequency communication links to communicatively connect to the vehicle 112; e.g., utilize wireless communication link(s) to communicatively connect with the electronic device 144. Where the communication network 128 comprises the Internet or other data packet networks, data communications may take place over the communication network 128 via an Internet or other suitable data packet communication protocol. In some arrangements, the communication network 128 additionally or alternatively includes one or more wired communication links or networks.

The back-end components 108 include third party service providers 136, a database 132, and one or more servers 124, which may be implemented as a sever bank or cloud computing system. The server 124 may include one or more computer processors adapted and configured to execute various software applications (e.g., a storage application, an analysis application, etc.) and components of the system 100, in addition to other software applications.

The server 124 may further include or be communicatively connected to one or more data storage devices or databases 132, which may be adapted to store data related to the operation of the vehicle 112, the environment and context in which the vehicle is operating, locations of storage facilities, services rendered by storage facilities, a schedule of when storage facilities are available, and/or other information. For example, the one or more databases 132 may be implemented as a data bank or a cloud data storage system, at least a portion of which may be locally accessed by the server 124 using a local access mechanism such as a function call or database access mechanism, and/or at least a portion of which may be remotely accessed by the server 124 using a remote access mechanism such as a communication protocol. The server 124 may access data stored in the one or more databases 132 when executing various functions and tasks associated with the present disclosure.

In some embodiments, the server 124 can include an autonomous vehicle database, an autonomous vehicle schedule database, a storage facility database, a storage facility schedule database, a service provider database, a storage preference database, and a services performed database. The various databases 132 stored on the memory of the server 124 contain information, which a processor of the server 124 uses when storing the vehicles 112. In particular, the processor of the server 124 uses the various databases 132 to determine a preferred storage facility, from the storage facility database, at which the vehicle 112 will be stored. As will be discussed later, the processor of the server 124 selects the preferred storage facility depending on a number of factors (e.g., schedule of the vehicle requesting to be stored, proximity to a point of interest, etc.).

Turning to the autonomous vehicle database which includes information regarding the vehicles 112 that are stored in the database 132. For example, the autonomous vehicle database can include the make and model of the vehicle 112, color of the vehicle 112, number of passengers the vehicle 112 is capable of transporting, etc. The autonomous vehicle database may also include geographic restrictions for each vehicle 112. For example, the autonomous vehicle database can include particular villages, towns, cities, or states where the vehicle 112 is permitted to go or where the vehicle 112 is not permitted to go. Additionally, the vehicles 112 stored in the autonomous vehicle database may be sorted into various groups. For example, the vehicles 112 can be sorted according to size of the vehicle 112 (e.g., compact, midsize, oversized), class of the vehicle 112 (e.g., luxury, commercial, standard), color of the vehicle 112 (e.g., red, black, blue, green, white, etc.), passenger capacity, etc. Moreover, the processor of the server may use as many or as few data points from the autonomous vehicle database in determining the preferred storage facility from the storage facility database.

The autonomous vehicle database may also include information regarding the owner(s) of the vehicle 112 stored in the autonomous vehicle database. For example, the ownership information stored in the autonomous vehicle database can be consider an ownership profile because each vehicle 112 stored in the autonomous vehicle database is linked to a specific owner(s). Where the owner is a single person, the autonomous vehicle database may include the first and last name of the owner, payment information from the owner (e.g., credit card number, debit card number, bank routing information, etc.), rideshare information of the owner (e.g., Lyft profile, Uber profile, etc.), and an address of the owner. Where the owner is a corporate entity (e.g., corporation, limited liability company ("LLC"), limited liability partnership ("LLP"), general partnership, etc.), the autonomous vehicle database can include the legal name of the corporate entity, an address for the headquarters of the corporate entity, contact information for the corporate entity, number of vehicles 112 owned by the corporate entity, and a brief description of the corporate entity. In such an embodiment, the autonomous vehicle database links each vehicle 112 owned by a corporate entity to the specific corporate entity.

The storage facility database includes information about the storage facilities 116 where vehicles 112 may be stored and services offered at each of the storage facilities. In particular, the storage facility database may include ownership information of the storage facility 116 (e.g., name of the owner, whether owner is a private individual or a corporate entity, address of the storage facility, etc.), the size of the storage facility 116 (e.g., square feet, square meters, vehicle capacity, etc.), amenities or services offered at the storage facility 116 (e.g., charging of the vehicle, cleaning of the vehicle, minor repairs of the vehicle, major repairs of the vehicle, etc.), location of the storage facility 116 (e.g., country, city, state, etc.), points of interest and the distance from the storage facility 116 to each point of interest (e.g., airports, ports, train stations, etc.), and preferences for the types of vehicles 112 that can be stored in the storage facility 116. In such an embodiment, the ownership information for each of the storage facilities 116 stored in the storage facility database may be considered a storage facility profile. Additionally, the storage facilities 116 recorded in the storage facility database may be sorted according to the size of the storage facility 116, amenities or services offered at the storage facility 116, location of the storage facility 116, points of interest and the distance from the storage facility 116 to each point of interest, and storage preferences of the storage facility 116. Further, in determining the preferred storage facility from the storage facilities 116 recorded in the storage facility database, the processor of the server 124 may use as many or as few data points from the storage facility database.

The autonomous vehicle schedule database may include scheduling information for individual vehicles 112 registered with the application. In particular, the autonomous vehicle schedule database may include a schedule for each vehicle 112 stored in the autonomous vehicle database (i.e., the schedules of the individuals who own the autonomous vehicle, the schedules of autonomous vehicles used by rideshare companies, etc.) and a schedule for a fleet of vehicles 112 stored in the autonomous vehicle database. In some embodiments, the schedule for a vehicle 112 can be the schedule of the owner, or the family of the owner, of the vehicle 112. In such examples, the schedule of the owner, or the family of the owner, of the vehicle 112 can be uploaded or sent to the autonomous vehicle schedule database using any communication protocols discussed herein. Additionally, the schedule of the owner, or the family of the owner, of the vehicle 112 may be updated in real time. In other embodiments, the schedule for a fleet of vehicles 112 can be a schedule for each vehicle 112 in the fleet of vehicles 112. In such examples, the schedule for each vehicle 112 in the fleet of vehicles 112 can be uploaded to or sent to the autonomous vehicle schedule database from a remote server (e.g., a server used by a rideshare company to track and schedule rides requested by users of the application, a server used by companies that stores calendar data for individuals who use the company's calendar application, etc.). The schedule for each vehicle in the fleet of vehicles 112 may be sent to the server using any communication protocol discussed herein.

The storage facility schedule database may include scheduling information for the storage facilities 116 stored in the database 132. In particular, the storage facility schedule database may include a schedule for each storage facility 116 stored in the storage facility database. For example, the schedule for a storage facility 116 can include when the storage facility 116 will be occupied and when the storage facility 116 will be vacant. Additionally, in a multi-vehicle storage facility 116 capable of storing more than one vehicle 112, the storage facility schedule database may include when each individual spot in the multi-vehicle storage facility will be occupied and when each individual spot in the multi-vehicle storage facility will be vacant.

The service provider database may include owners of storage facilities and third parties that are capable of performing maintenance and other services to autonomous vehicles. For example, the service provider database can include storage facility owners capable of cleaning the interior of a vehicle 112, washing the exterior of a vehicle 112, performing a twenty-nine-point inspection of a vehicle 112, performing minor repairs to a vehicle 112, and performing major repairs to a vehicle 112. In addition to storage facility owners capable of performing the aforementioned services, the service provider database may also include third-party service providers 136 capable of performing the aforementioned services. In such embodiments, the service provider database can include information about each of the third-party service providers 136 in the service provider database. For example, the information can include the name of the third-party service provider, the location of the third-party service provider, services rendered by the third-party service provider, and a schedule of the third-party service provider. Additionally, in the case of both storage facility owners and third-party service providers 136, the service provider database may include a cost associated with the services offered by each of the storage facility owners and the third-party service providers 136. Such a feature may permit owners of individual vehicles 112 and owners of fleets of vehicles 112 to select storage facility owners and third-party service providers 136 based on a cost of the services the third-party service providers can render.

The storage preference database may include a set or listing of preferences for storing the vehicle 112. For example, the storage preference database can include geographic locations where the vehicle 112 can or cannot be stored, a maximum distance the vehicle 112 can travel to reach a storage facility 116, services permitted to be performed on the vehicle 112 without the owner present, types of storage facilities where the vehicle 112 can be stored, whether the vehicle 112 can cross state lines, whether the vehicle 112 can cross state lines to reach a storage facility 116 located in another state, whether the vehicle 112 can remain stored in a storage facility 116 in another state, etc.

Additionally, or alternatively, the storage preference database may include the preferences of the owner of an individual vehicle 112 or the preferences of the owner of a fleet of vehicles 112 with respect to any of the aforementioned databases. Additionally, storage preferences for owners of individual vehicles 112 and for owners of fleets of vehicles 112 may be input via the electronic device 120, 144 and stored in the database 132. For example, in some embodiments, the electronic device 120, 144 can prompt the user for storage preferences by displaying a number of questions and receive an input from the owner for each displayed question, via a user interface of the electronic device 120, 144. The electronic device 120, 144 then transmits the storage preferences to the server 124 via the communication network 128, which are then stored in the database 132.

The service preformed database may include a list of services rendered to the vehicle 112, a list of services prices, a first timestamp corresponding to an arrival of the vehicle 112 in the storage facility 116, and a second timestamp corresponding to a departure of the vehicle 112 from the storage facility 116. In some embodiments, the list of services rendered can include any and all services that were performed by either the third-party service providers 136 or by the owner of the storage facility and the list of service prices can include a cost for each service offered by the third-party service providers 136 and for each service offered at the storage facilities 116. In such an embodiment, the computer processor of the server 124 retrieves the list of services rendered and the list of service prices stored in the service performed database. The computer processor then cross references the list of services rendered with the list of service prices and generates a storage cost. In other embodiments, the service performed database can also determine the storage cost using a storage duration for the vehicle 112 stored in the storage facility 116. In such an embodiment, the computer processor of the server 124 retrieves the first and second timestamps associated with the arrival and departure, respectively, of the vehicle 112 and the list of service prices stored in the service performed database. The computer processor may then determine the storage duration using the first and second timestamps and cross reference the storage duration with the list of service prices and generate the storage cost. In yet another embodiment, the computer processor retrieves the list of services rendered, the list of service prices, the first timestamp, and the second timestamp from the service performed database. After determining the storage duration using the first and second timestamps, the computer processor can cross reference the list of services rendered and the storage duration with the list of service prices and generate the storage cost. In each embodiment, the server 124 can transmit the storage cost to the electronic device 120, 144 and the electronic device 120, 144 can display the service cost via the user interface of the electronic device 120, 144.

As briefly discussed above, the back-end components 108 include the third-party service providers 136. The third-party service providers 136 may be an individual or a company capable of rendering vehicle 112 related services such as, for example, charging the vehicle 112, cleaning of the interior of a vehicle 112, washing of the exterior of a vehicle 112, performing a twenty-nine-point inspection of a vehicle 112, performing minor repairs to a vehicle 112, and performing major repairs to a vehicle 112. In some embodiments, the third-party service providers 136 and the services the third-party service providers 136 can render are stored in the service provider database. However, in other embodiments, the third-party service providers 136 are communicatively coupled to the communication network 128 and, in turn, the server 124 can access a third-party service provider database containing a list of services offered by the third-party service provider 136, a schedule of the third-party service provider 136, and a location of the third-party service provider 136.

To communicate with the server 124 and other portions of the back-end components 108, the front-end components 104 may include communication components that are configured to transmit information to and receive information from the back-end components 108 and, in some embodiments, transmit information to and receive information from other external sources, such as third-party service providers 136 (e.g., repairs shops, car washes, etc.). The communication components may include one or more wireless transmitters or transceivers operating at any desired or suitable frequency or frequencies.

Different wireless transmitters or transceivers may operate at different frequencies and/or by using different protocols, if desired. In an example, the electronic device 120, 144 may include a respective communication component for sending or receiving information to and from the server 124 via the communication network(s), such as over one or more radio frequency links or wireless communication channels which support a first communication protocol (e.g., GSM, CDMA, LTE, one or more IEEE 802.11 Standards such as Wi-Fi, WiMAX, BLUETOOTH, etc.). Additionally or alternatively, the computer 140 may operate in conjunction with an on-board transceiver or transmitter that is disposed at the vehicle 112 (which may, for example, be fixedly attached to the vehicle) for sending or receiving information to and from the server 124 via the communication network(s) 128, such as over one or more radio frequency links or wireless communication channels which support the first communication protocol and/or a second communication protocol.

When a control command (e.g., vehicle control instructions) is generated, or received, by the computer 140, it may thus be communicated to the control components of the vehicle 120 to affect a control action (e.g., turn on the vehicle, turn off the vehicle, accelerate the vehicle, slow the vehicle down, cause the vehicle to turn, etc.). In embodiments involving fully autonomous vehicles 112, the vehicle 112 may be operable only through such control components (not shown). In other embodiments, the control components may be disposed within or supplement other vehicle operator control components (not shown), such as steering wheels, accelerator or brake pedals, or ignition switches.

Further, the server 124 may generate a non-autonomous vehicle control command and transmit the non-autonomous vehicle control command to the computer 140 of the vehicle 112. The non-autonomous vehicle control command may include computer readable instructions that cause various non-driving related systems to operate. Accordingly, the computer 140 may control one or more operations of the vehicle 112 when operating non-autonomously. For example, the computer 140 may automatically detect respective triggering conditions and automatically activate corresponding features such as traction control, windshield wipers, headlights, braking, etc.

In embodiments, the server 124 may alternatively or additionally control the operation of the vehicle 112 according to various fully- or semi-autonomous operation features. In particular, the server 124 may include software applications or modules to generate and implement control commands to control the steering, braking, or motive power of the vehicles 112. In operation, the server 124 may generate control command(s) and communicate the control command(s) to the computer 140 via the communication network(s) 128 and the communication component, which may communicate the command(s) to the control components of the vehicle 112 to affect a control action.

Figure 2:
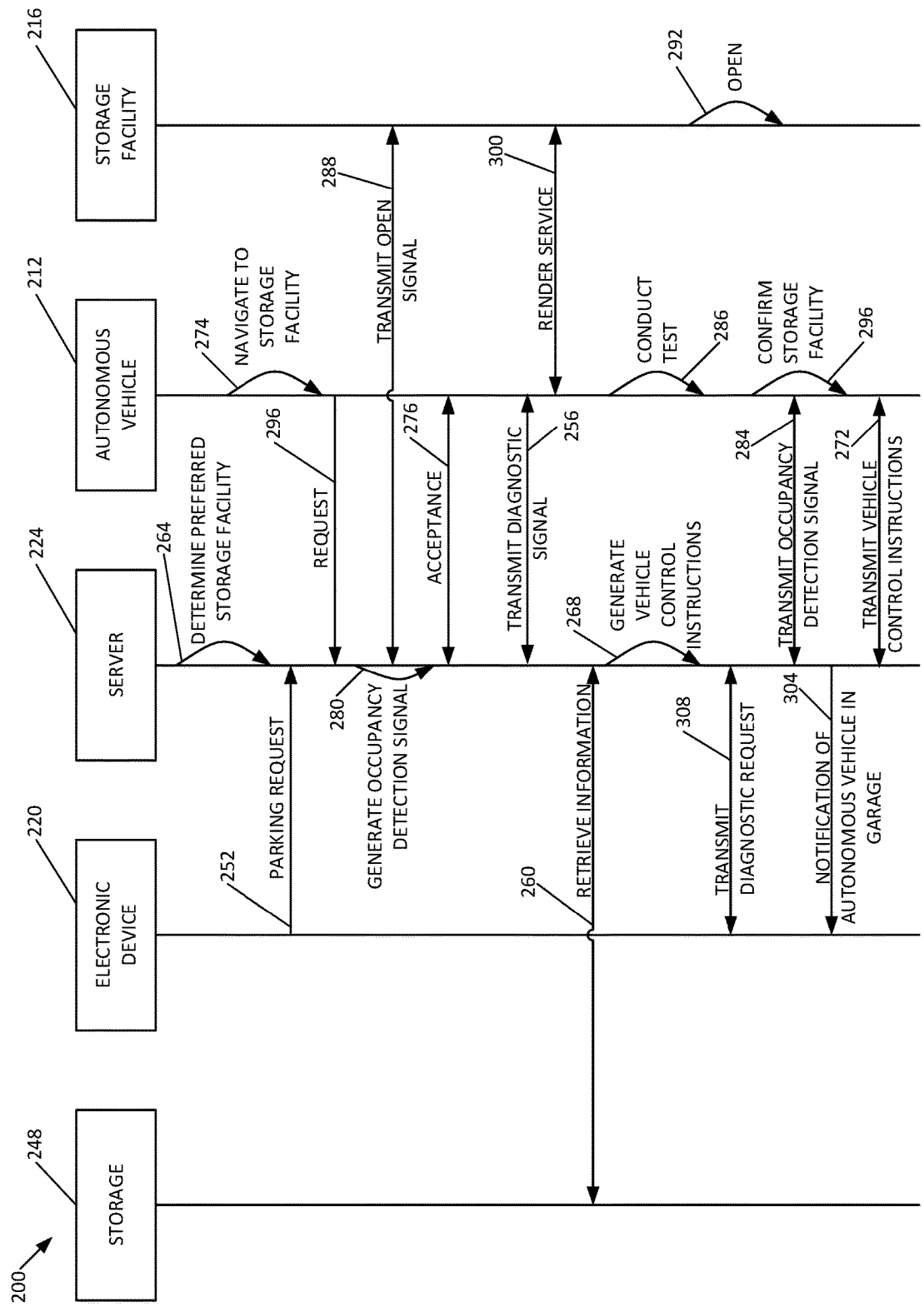
FIG. 2 depicts an example signal diagram associated with facilitating storage of an autonomous vehicle in a storage facility, in accordance with the teachings of the present disclosure.

Turning now to FIG. 2, which depicts a signal diagram 200 associated with facilitating vehicle 112 storage. The signal diagram 200 includes the vehicle 212 (such as the vehicles 112 discussed with respect to FIG. 1), an electronic device 220 (such as the electronic device discussed with respect to FIG. 1), a storage 248 (such as the memory of the server 124 discussed with respect to FIG. 1), a server 224 (such as the server 124 as discussed with respect to FIG. 1), and a storage facility 216 (such as the storage facilities 116 discussed with respect to FIG. 1).

In a preferred embodiment, the server 224 may be remote (i.e., back-end) from the vehicle 212, in which case the server 224 may communicate with the vehicle 212 via one or more communication networks. In alternative embodiments, the server 224 may be included as part of the vehicle 212 (i.e., onboard), in which case the server 224 may include a computer and a set of components configured to control operation of the vehicle 212.

The signal diagram 200 may begin when the server 224 receives a parking request (252) from the electronic device 220. According to embodiments, the parking request (252) may be indicative of a vehicle 212 in need of storage, charging, or general maintenance (e.g., cleaning, washing, minor repairs, and major repairs). In an embodiment, the parking request (252) is manually input to the electronic device 220 when an owner of an individual vehicle 212 or an owner of a fleet of vehicles 212 would like to store at least one vehicle 212. In such an embodiment, the vehicle 212 can be stored at the storage facility 216 for a variety of reasons. For example, the vehicle 212 can be stored at the storage facility 216 because the vehicle 212 needs to be charged, needs the exterior of the vehicle washed, needs the interior of the vehicle cleaned, needs a minor repair, or needs a major repair. In such embodiments, the vehicle 212 can conduct a self-diagnostic in response to a request from the electronic device 220 to determine whether the vehicle 212 is in need of any services. Alternatively, or in addition, an occupant or user of the vehicle 212 may submit the parking request (252) using the electronic device 220 if the occupant or user notices the vehicle 212 is in need of any of the aforementioned services.

However, the vehicle 212 may be also stored at the storage facility 216 when no services are needed. Rather, the vehicle 212, in some embodiments, can be stored at the storage facility 216 during a downtime period. For example, in some embodiments, the downtime period is while the owner of the vehicle 212 is working and not in need of the vehicle 212. In such an embodiment, owners of vehicles 212 in densely populated cities can submit a parking request (252) and, beneficially, do not have to look for a place to park their vehicle 212. Moreover, in an embodiment involving a fleet of vehicles 212 (e.g., a fleet of autonomous vehicles owned and operated by a rideshare company), the downtime period can be periods of time when fewer rides are being requested. During such a time, rather than parking the vehicles 212 on a street and potentially causing traffic, a number of vehicles 212 in the fleet may be parked in a storage facility 216. The rideshare company may service the parked vehicles 212 during storage.

In yet other embodiments, the downtime period can be a period of time prior to the next use of the vehicle 212. For example, the vehicle 212 can complete a final drop off of a passenger using a rideshare that employs the vehicles 212 and proceed to the storage facility 216 to charge or be cleaned, etc. However, the same vehicle 212 may have another passenger that needs to be picked up and dropped off later that day or the following day. In such a scenario, the computer processor of the server 224 can select a storage facility 216 near the pick-up location of the next passenger. The vehicle 212 may then travel to the storage facility 216 near the pick-up location of the next passenger during a time when there is little to no traffic thereby using less fuel (i.e., battery power, gasoline, hydrogen fuel cells, etc.) and keeping traffic to a minimum. As such, the vehicle 212 will already be near the pick-up location of the passenger and, again, save fuel and time in getting to the pick-up location allowing the vehicle 212 to be in service for longer thereby potentially generating more profit for the owner of the vehicle 212.

Alternatively, or additionally, the server 224 itself may determine the vehicle 212 needs to be stored at a storage facility 216. In such an embodiment, the server 224 can periodically transmit (256) a diagnostic signal to the vehicle 212 and determine if the vehicle 212 requires a service (e.g., cleaning, washing, charging, repair). In other embodiments, the server 224 can determine the vehicle 212 needs to be stored at the storage facility 216 based on a dataset received from a rideshare company. The dataset received may include information indicative of when and where demand for the vehicle 212 is high, when and where demand for the vehicle 212 is moderate, and when and where there is little to no demand for the vehicle 212. Accordingly, the server 224 may determine, based at least in part on the dataset received from the rideshare company, when the vehicle 212 may be stored at the storage facility 216 and whether the vehicle 212 needs any services while being stored at the storage facility 216.

In response to receiving a parking request (or determining the vehicle 212 needs to be stored), the server 224 may retrieve (260) a set of available storage facilities stored in the storage facilities database. According to an embodiment, retrieving (260) the set of available storage facilities can include retrieving the size of each of the available storage facilities, the location of each of the available storage facilities, the amenities or services offered at each of the available storage facilities, and points of interest and their respective distances from the storage facilities. The server 224 may further obtain a current location of the vehicle 212. According to some embodiments, the location may be in the form of GPS coordinates, and may indicate a roadway on which the vehicle 212 is traveling or has traveled.

Once the server 224 retrieves the set of available storage facilities and obtains the current location of the vehicle 212, the server 224 may determine (264) a preferred storage facility of the set of available storage facilities based in part on the current location of the vehicle 212 and a set of storage preferences stored in the storage preference database. In particular, the processor retrieves a set of storage preferences associated with the vehicle 212 that are stored in the storage preference database. The processor then uses the set of storage preferences associated with the vehicle 212 to determine the preferred storage facility in which to store the vehicle 212. In some embodiments, the processor of the server 224 retrieves an ownership profile for the vehicle 212, which includes a set of storage preferences of the owner of the vehicle 212. In such an embodiment, the processor determines (264) the preferred storage facility from the set of available storage facilities based in part on the set of storage preferences of the owner of the vehicle 212 and the current location of the vehicle 212.

While in the embodiments discussed above, the processor determines the preferred storage facility based in part on the current location of the vehicle 212 and the set of storage preferences stored in the storage preference database, it is envisioned that, in other embodiments, other parameters may be used by the processor in determining the preferred storage facility, in lieu of or in addition to the current location of the vehicle 212 and the set of storage preferences stored in the storage preference database.

For example, in some embodiments, the processor of the server 224 can determine the preferred storage facility using the current location of the vehicle 212 and data stored in the autonomous vehicle schedule database, which can include a schedule for a vehicle 212 owned by one person (i.e., the schedule for the vehicle 212 mirrors the schedule of the owner). The processor can retrieve the schedule associated with the vehicle 212 and, based in part on the schedule associated with the vehicle 212 and the current location of the vehicle 212, determine (264) the preferred storage facility. Alternatively, or in addition to, the autonomous vehicle schedule database may include schedules for fleets of vehicles 212 owned by rideshare companies. In such an embodiment, each schedule stored in the autonomous vehicle schedule database corresponds to a vehicle 212 that is part of the fleet of vehicles 212 owned by a rideshare company. Those schedules may be updated periodically, or in real time, to reflect new ride requests and to ensure the accuracy of the schedules stored in the autonomous vehicle schedule database. Accordingly, the processor can retrieve the schedule, or schedules, associated with vehicles 212 that are part of the fleet and, based in part on the schedule associated with the vehicle 212 and the current location of the vehicle 212, determine (264) the preferred storage facility.

In some embodiments, the processor of the server 224 can determine (264) the preferred storage facility using the current location of the vehicle 212 and data stored in the storage facility schedule database, which can include times when the storage facility 216 is occupied or vacant. For example, the storage facility schedule database can include a schedule for a storage facility 216 in a residential area disposed on private property (e.g., an attached garage, a detached garage). Accordingly, the processor can retrieve the schedule associated with the storage facility 216 in the residential area and, based in part on the schedule associated with the storage facility 216 and the current location of the vehicle 212, determine (264) the preferred storage facility. Alternatively, or in addition to, the storage facility schedule database may include schedules for larger, commercial storage facilities 216. Schedules stored in the storage facility schedule database may correspond to larger, commercial storage facility 216 (e.g., a warehouse like storage facility owned by a rideshare corporation). Those schedules may be updated periodically, or in real time, to reflect the larger volume of vehicles 212 passing through the storage facility 216 and to ensure the accuracy of the schedules stored in the storage facility schedule database. Accordingly, the processor can retrieve the schedules associated with larger, commercial storage facilities 216 and, based in part on the schedule associated with the storage facility and the current location of the vehicle 212, determine (264) the preferred storage facility.

In yet other embodiments, the processor of the server 224 can determine (264) the preferred storage facility using the current location of the vehicle 212 and data stored in the service provider database, which can include a set of third-party service providers and a list of the services offered by the third-party service providers. Accordingly, the processor can retrieve the set of third-party service providers and the list of services offered by the third-party service providers, and, based in part on the set of third-party service providers, the list of services offered by the third-party service providers, and the current location of the vehicle 212, determine (264) the preferred storage facility.

In other embodiments, the processor of the server 224 can determine the preferred storage facility using the current location of the vehicle 212 and data stored in the storage facility schedule database, the autonomous vehicle schedule database, and the service provider database, each of which is stored on the memory of the server 224. As discussed above, the processor can retrieve data points from each of the databases stored on the memory of the server 224 and, based in part on the data points retrieved and the current location of the vehicle 212, determine (264) the preferred storage facility.

Once the computer processor of the server 224 determines the preferred storage facility, the computer processor may generate (268) a set of vehicle control instructions. In particular, the computer processor may generate (268) the set of vehicle control instructions based on the location of the preferred storage facility and the current location of the vehicle 212. Further, the server 224 may transmit (272) the set of vehicle control instructions to the vehicle 212 via a communication network. After receipt, or generation, of the set of vehicle control instructions, a computing device (such as the computer 140 discussed with respect to FIG. 1) of the vehicle 212 may execute the set of vehicle control instructions to effectively cause the vehicle 212 to navigate (274) from the current location of the vehicle 212 to the location of the preferred storage facility.

In an embodiment, if an individual is present in the vehicle 212, the vehicle 212 may present (e.g., via the user interface of an electronic device) the navigation or path, and may optionally enable the individual to approve initiation of the navigation. In yet other embodiments, the server 224 may simultaneously transmit the vehicle control instructions to the electronic device 220 and a storage facility electronic device. In such an embodiment, the electronic device 220 and/or the storage facility electronic device may present (e.g., via a user interface of the electronic device) the navigation or path, and may optionally enable the individual in possession of the electronic device to approve initiation of the navigation. Further, in an embodiment, the vehicle 212 may automatically execute the instructions in response to receiving the set of vehicle control instructions.

After transmission and execution of the vehicle control instructions, the server may receive an acknowledgement or acceptance (276) from the vehicle 212 that the set of instructions were executed and that the vehicle 212 arrived at the preferred storage facility. The server 224 may record the acknowledgement in the memory 248 or a similar component. Accordingly, the sever 224 may subsequently access the acknowledgement and any data relating thereto, such as when generating a subsequent set of vehicle control instructions for the vehicle 212 and/or any additional vehicles 212. Further, the server 224 may transmit a notification (304) to the electronic device 220 that the vehicle 212 has arrived at the storage facility 216.

Once the server receives the arrival signal upon the vehicle 212 arriving at the preferred storage facility, the server may implement a number of steps to protect the safety of the owner of the preferred storage facility.

In some embodiments, the computer processor can generate (280) an occupancy detection signal in response to the server receiving the arrival signal and transmit (284) the occupancy detection signal to the vehicle 212. The occupancy detection signal causes the vehicle 212 to conduct (286) a test to determine whether an individual is within the vehicle 212 upon arrival at the preferred storage facility. The occupancy detection signal can, for example, activate sensors disposed within the vehicle 212 to determine whether an individual is within the vehicle 212. In response to the determination of whether an individual is within the vehicle 212, the server 224 may receive either an occupied signal or an unoccupied signal from the vehicle 212. The occupied signal indicates that the test determined that an individual is within the vehicle 212 and the unoccupied signal indicates that the test determined that an individual is not within the vehicle 212. In response to receiving the occupied signal, the computer processor may not transmit an open signal to the preferred storage facility. Rather, the computer processor can continue to periodically, at a determined time interval, generate and transmit additional occupancy detection signals until the server 224 receives the unoccupied signal. Accordingly, when the server 224 receives the unoccupied signal, the computer processor generates and transmits (288) an open signal to the preferred storage facility to which the preferred storage facility now permits access to the vehicle 212 and opens (292).

In other embodiments, the server 224 receives a storage facility confirmation request (296) from the vehicle 212 prior to entering the preferred storage facility. In such an embodiment, the storage facility confirmation request includes data about the storage facility 216 to which the vehicle 212 navigated. The computer processor of the server 224 then compares the data sent in the storage facility confirmation request to the information about the preferred storage facility stored in the storage facility database. If the data transmitted in the storage facility confirmation request matches the data stored in the storage facility database, then the computer processor may generate and transmit an approval signal indicating the vehicle 212 arrived at the correct storage facility. If, however, the data transmitted in the storage facility confirmation request does not matches the data stored in the storage facility database then the computer processor may generate and transmit an error signal indicating the vehicle 212 arrived at the incorrect storage facility. Accordingly, the processor of the server 224, in some embodiments, can generate and transmit a second set of vehicle control instructions for navigating the vehicle 212 from the storage facility at which the vehicle 212 is currently located to the location of the preferred storage facility 216.

After the vehicle 212 enters the preferred storage facility, one or more services may be rendered (300) to the vehicle(s) 212 while in the preferred storage facility. In some embodiments, the preferred storage facility is not a third-party service provider, but rather a garage attached to or disposed near a residential home or a commercial warehouse able to accommodate fleets of vehicles 212. In such embodiments, the vehicle 212 can be stored in such storage facilities for longer periods of time, such as during the downtime of the vehicle 212. In such storage facilities, the owners and/or employees of the storage facilities may render services to the vehicle 212. In fact, as discussed extensively above, the computer processor may have selected the preferred storage facility based in part on the services rendered at the storage facility 216.

In some embodiments, the server generates and transmits a service request to the storage facility electronic device (e.g., a desktop, a tablet, a mobile electronic device, a smart phone located at the storage facility). In response to receiving the service request, the storage facility electronic device may present the service request to the owner and/or employee of the preferred storage facility via the user interface of the storage facility electronic device. For example, the service request can include a prompt to wash the exterior of the vehicle 212, clean the interior of the vehicle 212, put air into at least one of the tires, and/or charge the vehicle 212.

In other embodiments, the server 224 may generate and transmit (308) a diagnostic request signal to the electronic device to determine if any services need to be rendered to the vehicle 212. In particular, the computer processor of the server 224 generates and transmits the diagnostic request signal to the electronic device (i.e., an electronic device associated with a passenger of the vehicle 212). Once received by the electronic device, the diagnostic request signal causes the electronic device to display at least one diagnostic prompt on the user interface of the electronic device. The at least one diagnostic prompt engages the user or passenger of the vehicle 212 to report any issues with the vehicle 212. In particular, the diagnostic request signal can cause the electronic device to display, via the user interface, at least one diagnostic request prompt regarding the overall state and condition of the vehicle 212. For example, the at least one diagnostic request prompt can include questions regarding the cleanliness of the interior of the vehicle 212, cleanliness of the exterior of the exterior of the vehicle 212, any drivability issues of the vehicle 212, and whether any amenities (e.g., water bottles, food, newspaper, etc.) are missing from the vehicle 212.

The server 224 may also communicate with third-party service providers via the communication network to have services rendered to the vehicle 212 by trained professionals and/or technicians. For example, if problems arise with any electronic control modules, GPS systems, and/or various sensors (e.g., accelerometers, tachometer, radar, LIDAR, camera, or other types of units that operate by using electromagnetic energy), then a trained professional and/or technician may need to render the repairs necessary.

For example, the server 224 can send an inspection signal to the vehicle 212 which causes the vehicle 212 to run a test of all the various components necessary to ensure the safety of other cars on the road, passengers in the vehicle 212, and pedestrians walking near the vehicle 212. Once the vehicle 212 runs the test, the server 224 receives a results signal which provides the computer processor of the server 224 with the results of the inspection. If no errors or issues arise, the computer processor may send a signal to the vehicle 212 indicating all components passed the inspection. Additionally, the computer processor may send the inspection signal to the electronic device, the storage facility electronic device, or other electronic device owned or accessible by the owner of the vehicle 212. However, if the computer processor receives the results signal and detects an error and/or issue with the vehicle 212, then the server 224 may determine a storage facility or a third-party service provider capable of performing the repairs necessary to remedy the error and/or issue.

In some embodiments, the computer processor of the server 224 transmits a third-party service request to a third-party service provider in response to receiving the results signal and detecting an error and/or issue with the vehicle 212. In particular, the server 224 and the third-party service provider are communicatively coupled via the communication network and the computer processor transmits the third-party service request to the third-party service provider via the communication. In response to transmitting the third-party service request, the server 224 receives a set of available appointments at the third-party service provider via the communication network. In some embodiments, the computer processor can retrieve the schedule of the vehicle 212 stored in the vehicle schedule database and cross-reference the schedule of the vehicle 212 with the set of available appointments and determine when the vehicle 212 is available for servicing. Once the computer processor makes the determination, the computer processor may transmit a reservation signal to the third-party service provider via the communication network and reserve a time and day for the vehicle 212 to be serviced.

In some embodiments, the computer processor can retrieve the schedule of the vehicle 212 stored in the vehicle schedule database and cross-reference the schedule of the vehicle 212 with the set of available appointments and determine a number of available days and times for the vehicle 212 to be serviced. The computer processor may then transmit the available days and times to the electronic device 220 of the owner of the vehicle 212 in need of servicing. In response to receiving the available days and times, the owner of the vehicle 212 may select a day and time of his or her choosing via the user interface of the electronic device 220 and transmit the selection to the server 224 via the communication network. Stated another way, the server 224 receives the input (e.g., a particular day and time) from the electronic device and may then transmit a reservation signal booking the particular day and time selected via the electronic device 220.

In the embodiments discussed above, the server 224 can retrieve the location of the selected third-party service provider, generate a set of vehicle control instructions based on a current location of the vehicle 212 and the location of the selected third-party service provider, and transmit the set of vehicle control instructions to the vehicle 212 such that execution of the set of vehicle control instructions causes the vehicle 212 to navigate from the current location of the vehicle 212 to the location of the selected third-party service provider, as discussed extensively above.

Figure 3:
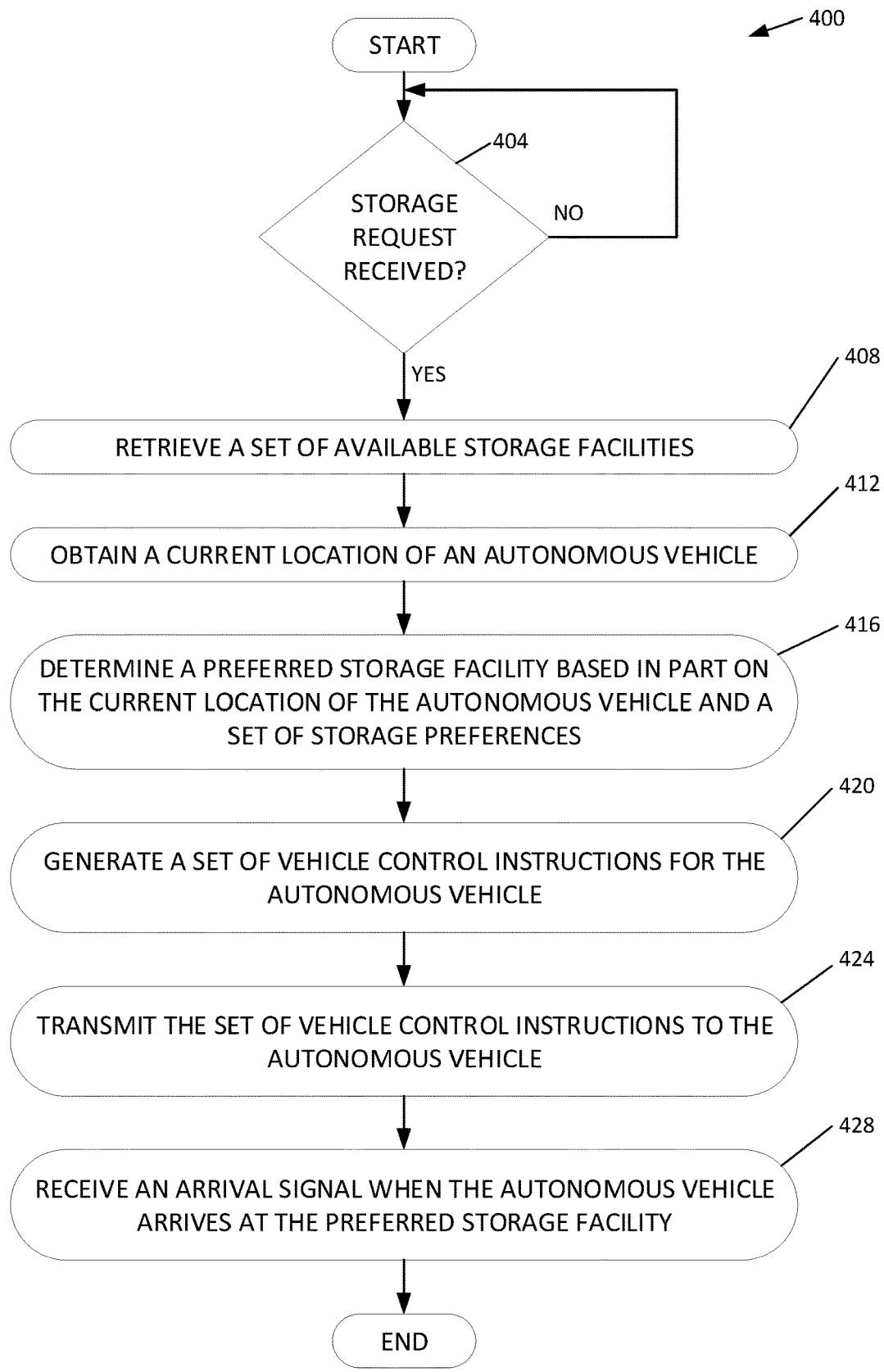
FIG. 3 depicts an example flow diagram associated with facilitating storage of an autonomous vehicle in a storage facility, in accordance with the teachings of the present disclosure.

FIG. 3 depicts a block diagram of an example method 400 for facilitating autonomous vehicle storage. The method 400 may be facilitated by a computing device that may be remote from or onboard the vehicle. Additionally, the computing device may be configured to communicate with one or more electronic devices or components.

The method 400 may begin when the computing device determines (block 404) whether a storage request was received. In embodiments, the computing device may receive the storage request from an electronic device or other component communicatively coupled to the computing device, or may locally detect a storage request. If a storage request is not detected ("NO"), processing may repeat or proceed to other functionality.

If a storage request is detected ("YES"), the computing device may retrieve (block 408) a set of available storage facilities stored in the storage facilities database. The computing device may obtain (block 412) a current location of an autonomous vehicle. In embodiments, the location may be in the form of GPS coordinates, and may indicate a roadway on which the autonomous vehicle is traveling or has traveled.

The computing device may determine (block 416) a preferred storage facility based in part on the current location of the autonomous vehicle and a set of storage preferences stored in the storage preferences database. In other embodiments, however, the computing device may determine the preferred storage facility based in part on the current location of the autonomous vehicle and data points from the databases stored on the memory of the server. In embodiments, the computing device may locally determine the preferred storage facility or may interface with a third-party source or component to determine the preferred storage facility.

The computing device may generate (block 420) a set of vehicle control instructions for the autonomous vehicle based on a location of the preferred storage facility and the location of the autonomous vehicle.

The computing device may transmit (block 424) the set of vehicle control instructions to the autonomous vehicle. The autonomous vehicle, or a computer of the autonomous vehicle, may execute the set of vehicle control instructions thereby causing the autonomous vehicle to navigate from the current location of the autonomous vehicle to the location of the preferred storage facility. The computing device may then receive (block 428) an arrival signal when the autonomous vehicle arrives at the preferred storage facility.

Figure 4:
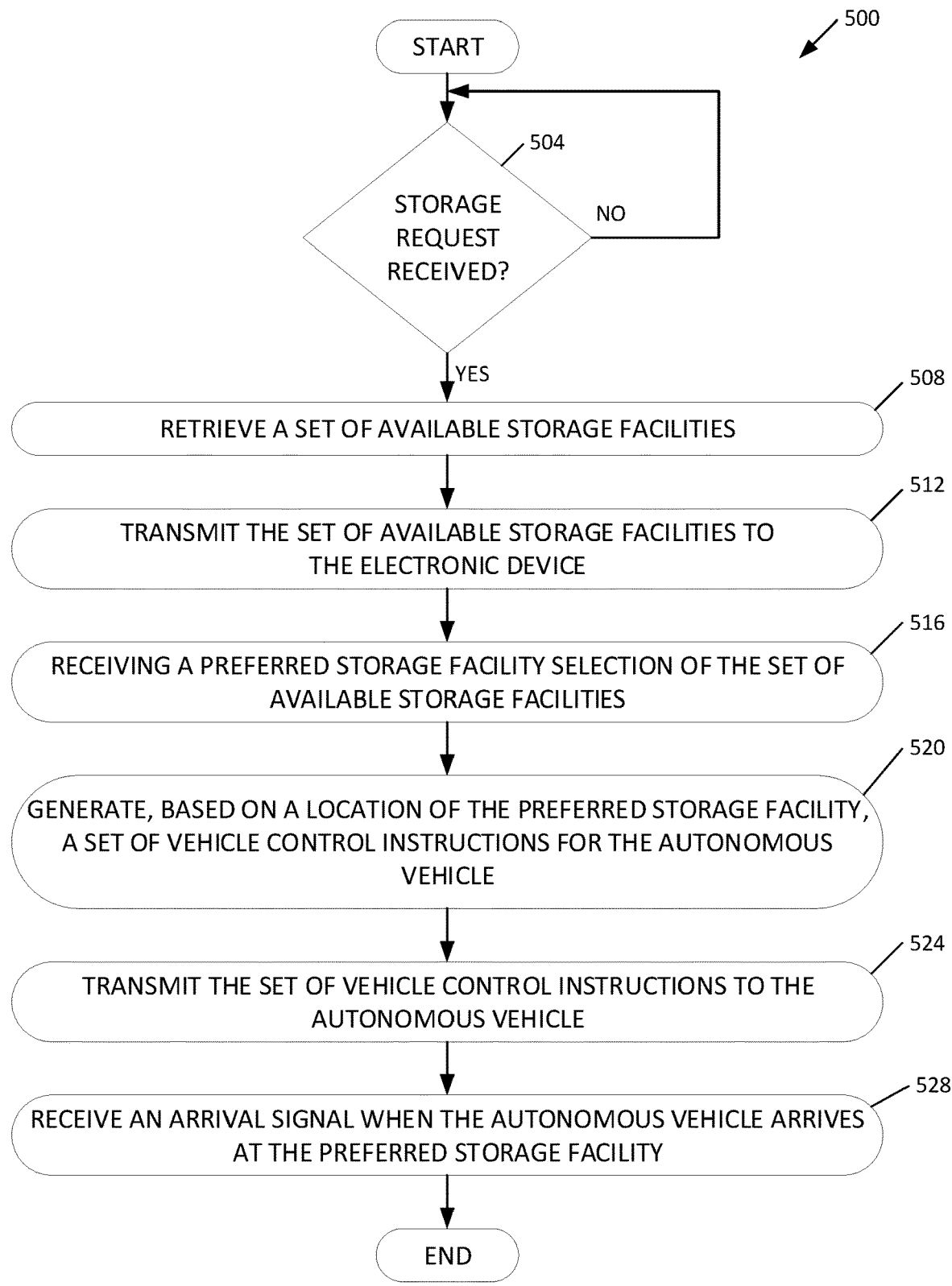
FIG. 4 depicts another example flow diagram associated with facilitating storage of an autonomous vehicle in a storage facility, in accordance with the teachings of the present disclosure.

FIG. 4 depicts a block diagram of another example method 500 for facilitating autonomous vehicle storage. The method 500 may be facilitated by a computing device that may be remote from or onboard the autonomous vehicle and where the computing device may be associated with an autonomous vehicle. Additionally, the computing device may be configured to communicate with one or more electronic devices or components.

The method 500 may begin when the computing device determines (block 504) whether a storage request was received. In embodiments, the computing device may receive the storage request from an electronic device or other component communicatively coupled to the computing device, or may locally detect a storage request. If a storage request is not detected ("NO"), processing may repeat or proceed to other functionality.

If a storage request is detected ("YES"), the computing device may retrieve (block 508) a set of available storage facilities stored in the storage facilities database. The computing device may transmit (block 512) the set of available storage facilities to the electronic device via a communication network. The computing device may receive (block 516) a preferred storage facility selection of the set of available storage facilities. The preferred storage facility, in this embodiment, is selected via a user interface of the electronic device.

The computing device may generate (block 520) a set of vehicle control instructions for the autonomous vehicle based on a location of the preferred storage facility and a location of the autonomous vehicle. In embodiments, the location may be in the form of GPS coordinates, and may indicate a roadway on which the autonomous vehicle is traveling or has traveled.

The computing device may transmit (block 524) the set of vehicle control instructions to the autonomous vehicle such that when the autonomous vehicle executes the set of vehicle control instructions, the autonomous vehicle navigates from the current location of the autonomous vehicle to the location of the preferred storage facility. The computing device may then receive (block 528) an arrival signal when the autonomous vehicle arrives at the preferred storage facility.

Figure 5:
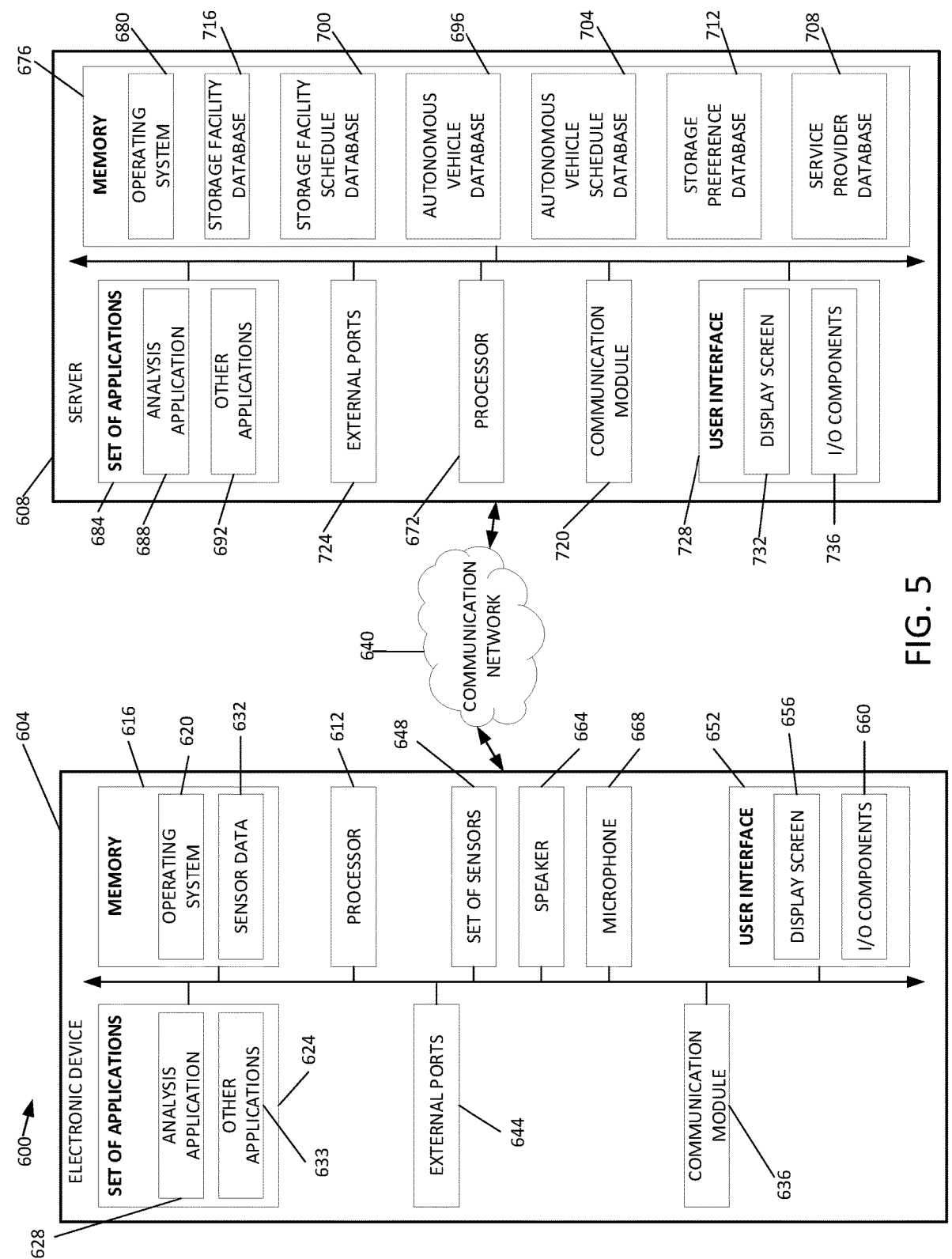
FIG. 5 is a hardware diagram of an example electronic device and an example server, in accordance with the teachings of the present disclosure.

FIG. 5 illustrates a hardware diagram 600 of an example electronic device 604 (such as the computer or the electronic device discussed with respect to FIG. 1) and an example server 608 (such as the server 124 discussed with respect to FIG. 1), in which the functions discussed herein may be implemented.

The electronic device 604 may include a processor 612 as well as well as a memory 616. The memory 616 may store an operating system 620 capable of facilitating the functionalities as discussed herein as well as a set of applications 624 (i.e., machine readable instructions). For example, one application of the set of applications may be an analysis application 628 configured to facilitate the functionalities discussed herein. It should be appreciated that one or more other applications 632 are envisioned, such as an autonomous vehicle operation application.

The processor 612 may interface with the memory 616 to execute the operating system 620 and the set of applications 624. According to some embodiments, the memory 616 may also include sensor data 632 including data accessed or collected from a set of sensors. The memory 616 may include one or more forms of volatile and/or non-volatile, fixed and/or removable memory, such as read-only memory (ROM), electronically programmed read-only memory (EPROM), random access memory (RAM), erasable electronic programmable read-only memory (EEPROM), and/or other hard drives, flash memories, MicroSD cards, and others.

The electronic device 604 may further include a communication module 636 configured to communicate data via one or more communication networks 640. According to some embodiments, the communication module 636 may include one or more transceivers (e.g., WWAN, WLAN, and/or WPAN transceivers) functioning in accordance with IEEE standards, 3GPP standards, or other standards, and configured to receive and transmit data via one or more external ports. For example, the communication module 636 may interface with another device, component, or sensors via the network 640 to retrieve sensor data 632.

The electronic device 604 may include a set of sensors 648 such as, for example, a location module (e.g., GPS chip), an image sensor, an accelerometer, a clock, a gyroscope, a compass, a yaw rate sensor, a tilt sensor, telematics sensors, and/or other sensors. The electronic device 604 may further include a user interface 652 configured to present information to a user and/or receive inputs from the user. As shown in FIG. 5, the user interface 652 may include a display screen 656 and input-output ("I/O") components 660 (e.g., ports, capacitive or resistive touch sensitive input panels, keys, buttons, lights, LEDs). According to some embodiments, the user may access the electronic device 604 via the user interface 652 to review information, make selections, and/or perform other functions. Additionally, the electronic device 604 may include a speaker 664 configured to output audio data and a microphone 668 configure to detect audio.

In some embodiments, the electronic device 604 may perform the functionalities as discussed herein as part of a "cloud" network or may otherwise communicate with other hardware or software components within the cloud to send, retrieve, or otherwise analyze data.

As illustrated in FIG. 5, the electronic device 604 may communicate and interface with the server 608 via the communication network(s) 640. The server 608 may include a processor 672 as well as a memory 676. The memory 676 may store an operating system 680 capable of facilitating the functionalities as discussed herein as well as a set of applications 684 (i.e., machine readable instructions). For example, one application of the set of applications 684 can be an analysis application 688 configure to facilitate the functionalities discussed herein. It should be appreciated that one or more applications 692 are envisioned.

The processor 672 may interface with the memory 676 to execute the operating system 680 and the set of applications 684. According to some embodiments, the memory 676 may also include databases containing sets of data. For example, the memory can include an autonomous vehicle database 696, a storage facilities schedule database 700, an autonomous vehicle schedule database 704, a service provider database 708, a storage preference database 712, and a storage facilities database 716. The memory 676 may include one or more forms of volatile and/or non-volatile, fixed and/or removable memory, such as read-only memory (ROM), electronically programmed read-only memory (EPROM), random access memory (RAM), erasable electronic programmable read-only memory (EEPROM), and/or other hard drives, flash memories, MicroSD cards, and others.

The server 608 may further include a communication module 720 configured to communicate data via the one or more communication networks 640. According to some embodiments, the communication module 720 may include one or more transceivers (e.g., WWAN, WLAN, and/or WPAN transceivers) functioning in accordance with IEEE standards, 3GPP standards, or other standards, and configured to receive and transmit data via one or more external ports 724. For example, the communication module 720 may receive, from the electronic device 604, a set(s) of sensor data 632.

The server 608 may further include a user interface 728 configured to present information to a user and/or receive inputs from the user. As shown in FIG. 5, the user interface 728 may include a display screen 732 and I/O components 736 (e.g., ports, capacitive or resistive touch sensitive input panels, keys, buttons, lights, LEDs). According to some embodiments, the user may access the server 608 via the user interface 728 to review information, make changes, input training data, and/or perform other functions.

In some embodiment, the server may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive) having computer-readable program code embodied herein, wherein the computer-readable program code may be adapted to be executed by the processors (e.g., working in connection with the respective operating systems) to facilitate the functions as described herein. In this regard, the program code may be implemented in any desired language, and may be implemented as machine code, assembled code, byte code, interpretable source code or the like (e.g., via Golang, Python, Scala, C, C++, Java, ActionScript, Objective-C, JavaScript, CSS, XML). In some embodiments, the computer program product may be part of a cloud network of resources.

Although the aforementioned text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that operations be performed in the order illustrated. Structures and functionality presented as separate components in example configurations may be implemented as a combined structure or component. Similarly, structures and functionality presented as a single component may be implemented as separate components. These and other variations, modification, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array ("FPGA") or an application-specific integrated circuit ("ASIC")) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or temporarily configured circuitry (e.g., configured by software), may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the process or processors may be located in a single location (e.g., within a home environment, an office environment, or as a server farm), while in other embodiments the processors may be distributed across a number of locations. In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical quantities (e.g., electronic, magnetic, or optical) within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or, and not to an exclusive or. For example, a condition "A or B" is satisfied by any of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

I claim:

1. A computer implemented method for facilitating storage of an autonomous vehicle in a storage facility, the method comprising:
   receiving, at a server, a storage request from an electronic device, the server including a storage facilities database and a storage preference database stored on a memory of the server;
   retrieving, by the server, in response to the storage request, a set of available storage facilities stored in the storage facilities database;
   obtaining, by the server, a current location of the autonomous vehicle;
   retrieving, by the server, a set of storage preferences corresponding to the autonomous vehicle from the storage preference database;
   determining, by a computer processor of the server, a preferred storage facility of the set of available storage facilities based only on:
   the current location of the autonomous vehicle;
   the set of storage preferences for the autonomous vehicle; and
   data from one or more of:
     an autonomous vehicle database;
     a storage facility schedule database;
     an autonomous vehicle schedule database; and
     a service provider database;
   generating, by the computer processor, based on a location of the preferred storage facility, a set of vehicle control instructions for the autonomous vehicle;
   transmitting, by the server, the set of vehicle control instructions to the autonomous vehicle, wherein the autonomous vehicle executes the set of vehicle control instructions to cause the autonomous vehicle to navigate from the current location of the autonomous vehicle to the location of the preferred storage facility;
   receiving, at the server, an arrival signal when the autonomous vehicle arrives at the preferred storage facility;
   generating, by the computer processor, an occupancy detection signal in response to receiving the arrival signal;
   transmitting, via a communication module of the server, the occupancy detection signal to the autonomous vehicle;
   receiving, at the server, one of:
     an occupied signal from the autonomous vehicle that is indicative of a presence of a passenger within the autonomous vehicle; and
     an unoccupied signal from the autonomous vehicle that is indicative of an absence of a passenger within the autonomous vehicle;
   generating and transmitting, by the computer processor at a determined time interval, in response to receiving the arrival signal and the occupied signal, additional occupancy detection signals until the server receives the unoccupied signal; and
   transmitting, by the computer processor, in response to receiving the arrival signal and the unoccupied signal, an open signal to the preferred storage facility.

2. The computer implemented method of claim 1, wherein, the autonomous vehicle database comprises a set of autonomous vehicles, the storage facility schedule database comprises a set of storage facility schedules, the autonomous vehicle schedule database comprises a set of autonomous vehicle schedules, and the service provider database comprises a set of service providers.

3. The computer implemented method of claim 1, further comprising:
   transmitting, via a transceiver of the server, a service signal to the electronic device, the service signal indicating the autonomous vehicle requires servicing.

4. The computer implemented method of claim 3, wherein the electronic device generates a service message in response to the service signal and displays, via a user interface of the electronic device, the service message.

5. The computer implemented method of claim 4, wherein the service message is selected from the group consisting of: washing an exterior of the autonomous vehicle, cleaning an interior of the autonomous vehicle, performing an inspection of the autonomous vehicle, performing a minor repair of the autonomous vehicle, performing a major repair of the autonomous vehicle, and charging the autonomous vehicle.

6. The computer implemented method of claim 1, further comprising transmitting, by the server, in response to receiving the arrival signal and the occupied signal, an error signal to the electronic device, the error signal being indicative of the presence of the passenger within the autonomous vehicle.

7. The computer implemented method of claim 1, further comprising:
   generating, by the computer processor, a diagnostic request signal;
   transmitting the diagnostic request signal to the autonomous vehicle; and
   receiving, at the server, a diagnostic results signal in response to the autonomous vehicle conducting a diagnostic test in response to receiving the diagnostic request signal.

8. The computer implemented method of claim 1, further comprising: receiving, at the server, a service request from the autonomous vehicle;
   generating, by the computer processor, a third-party service request signal in response to receiving the service request; and
   transmitting, via a communication network, the third-party service request signal to a third-party service provider, wherein the third-party service provider is communicatively coupled to the communication network.

9. A system for facilitating storage of an autonomous vehicle in a storage facility, the autonomous vehicle communicatively coupled to an electronic device having a user interface, the system comprising:
- a server having a storage facilities database and a storage preference database stored on a memory of the server;
- a transceiver configured to communicatively couple the server, the autonomous vehicle, and the electronic device via at least one network connection;
- a set of computer-executable instructions stored on the memory; and
- a processor of the server interfacing with the transceiver, the memory, and the electronic device, and configured to execute the set of computer-executable instructions to cause the processor to:
  - receive, via the transceiver, a storage request from the electronic device; and
  - in response to receiving the storage request from the electronic device:
    - retrieve a set of available storage facilities from the storage facilities database;
    - obtain a location of the autonomous vehicle;
    - retrieve a set of storage preferences corresponding to the autonomous vehicle from the storage preference database from the memory;
    - determine a preferred storage facility based only on:
      - the location of the autonomous vehicle;
      - the set of storage preferences for the autonomous vehicle; and
      - data from one or more of:
        - an autonomous vehicle database;
        - a storage facility schedule database;
        - an autonomous vehicle schedule database; and
        - a service provider database;
    - generate, based on the location of the autonomous vehicle and a location of the preferred storage facility, a set of vehicle control instructions for the autonomous vehicle;
    - provide the set of vehicle control instructions to the autonomous vehicle via the transceiver, wherein the autonomous vehicle executes the set of vehicle control instructions to cause the autonomous vehicle to navigate from the location of the autonomous vehicle to the location of the preferred storage facility;
    - receive an arrival signal when the autonomous vehicle navigates to the preferred storage facility;
    - generate an occupancy detection signal in response to receiving the arrival signal;
    - transmit, via a communication module of the server, the occupancy detection signal to the autonomous vehicle;
    - receive, at the server, one of:
      - an occupied signal from the autonomous vehicle that is indicative of a presence of a passenger within the autonomous vehicle; and
      - an unoccupied signal from the autonomous vehicle that is indicative of an absence of a passenger within the autonomous vehicle;
    - generate and transmit, by the processor at a determined time interval, in response to receiving the arrival signal and the occupied signal, additional occupancy detection signals until the server receives the unoccupied signal; and
    - transmit, by the processor, in response to receiving the arrival signal and the unoccupied signal, an open signal to the preferred storage facility.

10. The system of claim 9, wherein the autonomous vehicle database comprises a set of autonomous vehicles, the storage facility schedule database comprises a set of storage facility schedules, the autonomous vehicle schedule database comprises a set of autonomous vehicle schedules, and the service provider database comprises a set of service providers.

11. The system of claim 9, wherein the computer-executable instructions further cause the processor to:
- retrieve the set of available storage facilities by determining the available storage facilities based in part on at least one of:
  - (a) the set of storage facility schedules stored in the storage facility schedule database,
  - (b) the set of autonomous vehicle schedules stored in the autonomous vehicle schedule database, and
  - (c) the set of service providers stored in the service provider database and data comprising, for each storage facility owner and each third-party service provider stored in the service provider database:
    - a name of the third-party service provider;
    - a location of the third-party service provider;
    - services rendered; and
    - a cost associated with the services offered by each of storage facility owners and the third-party service providers.

12. The system of claim 9, wherein the computer-executable instructions further cause the processor to:
- transmit a service signal to the electronic device, the service signal indicating the autonomous vehicle requires servicing.

13. The system of claim 9, wherein the computer-executable instructions further cause the processor to:
- transmit an open signal in response to receiving the arrival signal.

14. The system of claim 9, wherein the computer-executable instructions further cause the processor to:
- generate an occupancy detection signal in response to receiving the arrival signal; and
- transmit the occupancy detection signal to the autonomous vehicle.

15. The system of claim 9, wherein the server further comprises a service performed database saved on the memory, the service performed database comprising a list of services rendered to the autonomous vehicle, a list of service prices, a first timestamp, and a second timestamp.

16. The system of claim 15, wherein the computer-executable instructions further cause the processor to:
- generate, based on the list of services rendered, the list of service prices, the first timestamp, and the second timestamp, a storage cost;
- transmit, via the transceiver, the storage cost to the electronic device such that the user interface of the electronic device displays the storage cost; and
- request payment of the storage cost.

17. The system of claim 9, wherein the computer-executable instructions further cause the processor to:
- transmit the set of vehicle control instructions to the electronic device.

18. The system of claim 17, wherein the processor receives at least one of an acceptance signal or a denial signal from the electronic device in response to transmitting the set of vehicle control instructions to the electronic device.

19. The system of claim 9, wherein the computer-executable instructions further cause the processor to:
- generate a diagnostic request signal configured to display at least one diagnostic request prompt on the user interface of the electronic device; and transmit, via the transceiver, the diagnostic request signal to the electronic device.

20. The system of claim 19, wherein the processor receives, in response to transmitting the diagnostic request signal, at least one input received by the user interface of the electronic device.

21. The system of claim 9, wherein the processor receives a service request from the autonomous vehicle; and
   wherein the computer-executable instructions further cause the processor to:
      generate a third-party service request signal in response to receiving the service request; and
      transmit the third-party service request signal to a third-party service provider,
   wherein the third-party service provider is communicatively coupled to the transceiver via the at least one network connection.

* * * * *